United States Patent [19]

Bournas et al.

[11] Patent Number: 6,061,679

[45] Date of Patent: May 9, 2000

[54] CREATING AND SEARCHING A DATA STRUCTURE ORDERED BY RANGES OF KEY MASKS ASSOCIATED WITH THE DATA STRUCTURE

[75] Inventors: Redha M. Bournas, Chapel Hill, N.C.; Valery I. Garger, Ithaca, N.Y.

[73] Assignee: International Business Machines Corporation, Armonk, N.Y.

[21] Appl. No.: 08/976,933

[22] Filed: Nov. 25, 1997

[51] Int. Cl.[7] .................................................... G06F 17/30
[52] U.S. Cl. ................... 707/3; 707/7; 707/101; 707/103; 370/392
[58] Field of Search ................ 707/3, 103, 101, 707/7, 102, 5, 4, 202; 711/202, 1.08; 370/392, 422, 230, 398; 364/253, 251

[56] References Cited

U.S. PATENT DOCUMENTS

| | | | |
|---|---|---|---|
| 4,468,728 | 8/1984 | Wang | 364/200 |
| 5,095,480 | 3/1992 | Fenner | 370/94.1 |
| 5,386,413 | 1/1995 | McAuley et al. | 370/54 |
| 5,519,858 | 5/1996 | Walton et al. | 395/600 |
| 5,539,922 | 7/1996 | Wang | 455/456 |
| 5,557,786 | 9/1996 | Johnson, Jr. | 707/101 |
| 5,574,910 | 11/1996 | Bialkowski et al. | 395/601 |
| 5,640,551 | 6/1997 | Chu et al. | 707/5 |
| 5,655,129 | 8/1997 | Ito | 707/532 |
| 5,701,467 | 12/1997 | Freeston | 707/101 |
| 5,787,430 | 7/1998 | Doeringer et al. | 707/3 |

OTHER PUBLICATIONS

Sklower, Keith—University of California, Berkeley, "A Tree–Based Packet Routing Table for Berkeley Unix", USENIX—Winter '91—Dallas, TX, pp 93–99 (1991).

"Memory Organization Scheme for the Implementation of Routing Tables in High Performance IP Routers", IBM Technical Disclosure Bulletin, vol. 36, No. 02, pp. 151–153 (Feb. 1993).

Sedgewick, R., "Algorithms in C", Chapter 17—Radix Searching, pp 253–257, Addison–Wesley Publishing Company, Inc. (1990).

Stevens, W.R., Wright, G.R., TCP/IP Illustrated vol. 2, Chapter 18, Section 18.2, "Routing Table Structure," pp 562–569, Addison–Wesley Publishing Company, Inc. (1995).

*Primary Examiner*—Hosain T. Alam
*Assistant Examiner*—Thu-Thao Havan
*Attorney, Agent, or Firm*—Heslin & Rothenberg, P.C.

[57] ABSTRACT

A data structure, which includes a plurality of sub-data structures, is created. The sub-data structures are ordered based on ranges of key masks associated with the sub-data structures. In particular, in one example, the sub-data structures are linked in a list in ascending order of key mask ranges, thus, creating an ordered list of sub-data structures. The ordered data structure can be modified by adding new nodes to existing sub-data structures or by adding new sub-data structures. Further, nodes or sub-data structures can be removed from the ordered data structure. The data structure can also be searched in order to collect target records associated with requested keys of the data structure.

92 Claims, 8 Drawing Sheets fig. 1a fig. 1b fig. 2 fig. 3a fig. 3b fig. 3c fig. 4a fig. 4b fig. 5a

REMOVE CONTINUED fig. 5b fig. 6

CREATING AND SEARCHING A DATA STRUCTURE ORDERED BY RANGES OF KEY MASKS ASSOCIATED WITH THE DATA STRUCTURE

TECHNICAL FIELD

This invention relates, in general, to searching within a data structure and, in particular, to creating an ordered data structure and searching within that ordered data structure.

BACKGROUND ART

There is an ever increasing need for efficiency in creating, modifying and searching data structures. This need is particularly pertinent to routing problems, in which the goal is to find the correct destination(s) for every incoming request, as quickly and efficiently as possible. Typical routing problems include the routing of network addresses used by the Internet Protocol; the routing of logical units used by the IBM Standards Communication Architecture (SNA) protocol; and other general routing mechanisms, to name a few examples.

Although efficiency is important for routing problems, the need for efficiency in creating, modifying and searching data structures is not unique to routing problems. Efficiency is just as important in other situations in which information needs to be gathered for a given request. For example, in Telenet applications, when a user logs on to a computer, information about the user is needed. This information includes, for instance, the applications to be started during log on and the printer to be used by the user. This information needs to be collected as fast as possible in order to provide an efficient log on.

One searchable data structure that has been used, particularly in routing problems, is a PATRICIA (Practical Algorithm to Retrieve Information Coded in Alphanumeric) tree. The PATRICIA tree organization is based on a binary tree that enables searching for exact key matches.

However, if the requested key is part of a group and the exact match is not found, then the PATRICIA tree organization fails to provide a way to find a best match for the key. That is, it does not provide a solution to find the next smaller or next bigger element than the requested key. Additionally, the PATRICIA tree organization does not lead to an efficient technique for traversing the tree in either ascending or descending order. Specifically, the PATRICIA tree organization does not provide for the ordering of keys.

Based on the foregoing, a data structure and search technique are needed that allow for efficiency in locating a best match for a given key. A further need exists for an efficient technique for traversing a data structure in ascending or descending order. Another need exists for a general search data structure and techniques that can be used in many applications, including, but not limited to, routing and Telenet applications.

SUMMARY OF THE INVENTION

The shortcomings of the prior art are overcome and additional advantages are provided through the provision of a method of creating a data structure. The method includes, for example, obtaining a plurality of sub-data structures, and ordering the plurality of sub-data structures based on ranges of key masks associated with the plurality of sub-data structures. The data structure includes the ordered plurality of sub-data structures.

In one embodiment, the ordering of the plurality of sub-data structures is based on an ascending order of the ranges of key masks. In another embodiment, the ordering includes linking the plurality of sub-data structures in a linked list in ascending order of the ranges of key masks.

The method also includes, in one example, determining the ranges of key masks associated with the plurality of sub-data structures. In one instance, the determining includes, for one key mask, converting the key mask into a binary notation, and counting a number of zeros within the binary notation. The number of zeros provide an indication of the range of the key mask. In particular, in one example, the range is two to the power of the number of zeros.

In further embodiments of the invention, additional nodes or sub-data structures can be inserted into the data structure; nodes or sub-data structures can be deleted from the data structure; and the data structure can be searched.

In another aspect of the present invention, a memory including a data structure is provided. The data structure includes a plurality of sub-data structures ordered based on ranges of key masks associated with the plurality of sub-data structures.

In yet another aspect of the present invention, at least one program storage device readable by a machine, tangibly embodying at least one program of instructions executable by the machine to perform a method of creating a data structure is provided. The method includes, for instance, obtaining a plurality of sub-data structures; and ordering the plurality of sub-data structures based on ranges of key masks associated with the plurality of sub-data structures. The data structure includes the ordered plurality of sub-data structures.

In a further aspect of the present invention, an article of manufacture is provided, which includes at least one computer useable medium having computer readable program code means embodied therein for causing the creating of a data structure. The computer readable program code means in the article of manufacture includes computer readable program code means for causing a computer to obtain a plurality of sub-data structures; and computer readable program code means for causing a computer to order the plurality of sub-data structures based on ranges of key masks associated with the plurality of sub-data structures, wherein the data structure includes the ordered plurality of sub-data structures.

In yet a further aspect of the present invention, a system of creating a data structure is provided. The system includes, for instance, a plurality of sub-data structures; and means for ordering the plurality of sub-data structures based on ranges of key masks associated with the plurality of sub-data structures, wherein the data structure includes the ordered plurality of sub-data structures.

The data structure and capabilities of the present invention advantageously enable efficiency in locating a best match for a given key. They further provide an efficient technique for traversing a data structure in ascending or descending order. Additionally, the data structure and capabilities of the present invention are general, such that they can be used in many applications, including, but not limited to, routing and Telenet applications.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a data structure, which includes a plurality of ordered sub-data structures, is created and searched. In one embodiment, the sub-data structures are ordered based on ranges of key masks associated with the sub-data structures. That is, the data structure includes, for instance, sub-data structures linked in a list in ascending order of key mask ranges, thus, creating an ordered list of sub-data structures.

The data structure of the present invention and the techniques used to create, modify and search the data structure may be incorporated in and used with many computing environments. One example of a computing environment incorporating and using the data structure of the present invention and the techniques associated therewith is depicted in FIG. 1a and described in detail below.

Figure 1A:
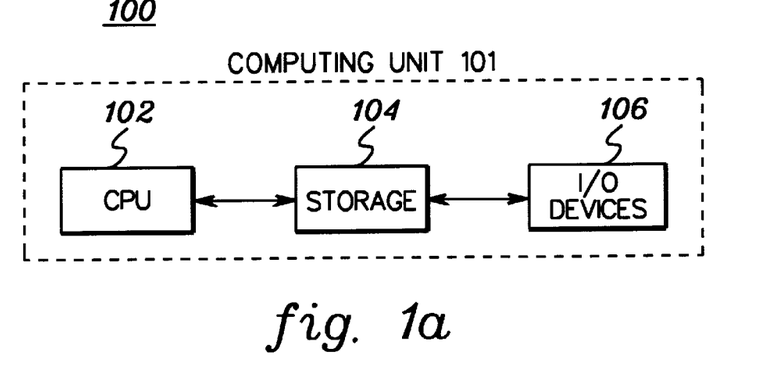
FIG. 1a depicts one example of a computing environment incorporating and using the data structure and capabilities of the present invention.

Referring to FIG. 1a, a computing environment 100 includes, for instance, a computing unit 101 having at least one central processing unit 102, a main storage 104 and one or more input/output devices 106, each of which is described below.

As is known, central processing unit (CPU) 102 is the controlling center of computing unit 101 and provides the sequencing and processing facilities for instruction execution, interruption action, timing functions, initial program loading and other machine related functions. The central processing unit executes at least one operating system, which as is known, is used to control the operation of the computing unit by controlling the execution of other programs, controlling communication with peripheral devices and controlling use of the computer resources.

Central processing unit 102 is coupled to main storage 104, which is directly accessible and provides for high-speed processing of data by the central processing unit. Main storage 104 may be either physically integrated with the CPU, or constructed in stand-alone units.

Main storage 104 is also coupled to one or more input/output devices 106. These devices include, for instance, keyboards, communications controllers, teleprocessing devices, printers, magnetic storage media (e.g., tapes, disks), direct access storage devices, and sensor based equipment. Data is transferred from main storage 104 to input/output devices 106 and from the input/output devices back to main storage.

In one example, computing environment 100 includes an Enterprise Systems Architecture ES/9000 main frame computer running a Multiple Virtual Storage (MVS) operating system, which are both offered by International Business Machines Corporation. As another example, computing environment 100 includes an RS/6000 computer system running an AIX operating system, which are also offered by International Business Machines Corporation. The invention is not limited to such environments, however. The data structure and capabilities of the present invention can be incorporated and used with many types of computer environments and with many types of computer systems or platforms. The above systems are only offered as examples.

Figure 1B:
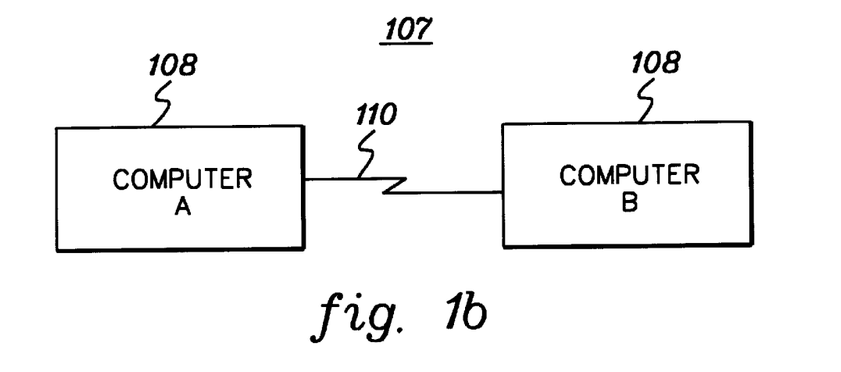
FIG. 1b depicts another example of a computing environment incorporating and using the data structure and capabilities of the present invention.

Another embodiment of a computing environment incorporating and using the data structure and capabilities of the present invention is depicted in FIG. 1b and described in detail below.

In one example, a computing environment 107 includes a plurality of computing units 108 coupled to one another via a connection 110. In one example, each unit is a UNIX workstation, running a UNIX-based operating system, and the units are coupled to one another via a TCP/IP connection. TCP/IP is only one example. Other examples include any type of wire connection, token ring or network connection, to name just a few. Each unit includes, for example, a central processing unit, memory and one or more input/output devices, as is well known in the art.

Again, the above-described computing environment is only one example. The data structure and capabilities of the present invention can be incorporated within and used with many types of computing units, computers, processors, nodes, systems, workstations and/or environments, without departing from the spirit of the present invention. For example, one or more of the units may be a PS/2 or be based upon the Enterprise Systems Architecture offered by International Business Machines Corporation. Further, the operating system need not be UNIX-based. It can include, for instance, MVS or other operating systems.

The data structure of the present invention, as well as the inventive techniques for creating, modifying and searching the data structure, are applicable to many situations including, but not limited to, routing, in general; the routing of requests according to network addresses used by the Internet Protocol (IP) (The IP protocol is used by Transmission Control Protocol (TCP)/IP set of protocols and the Open Systems Internet (OSI) TP set of protocols.); routing of logical units (LUs) used by the IBM Systems Network Architecture (SNA) protocol; and the obtaining of information for users of, for instance, Telenet. Some of the examples described herein are based on routing mechanisms; however, the data structure and techniques of the present invention are not limited to a routing mechanism. They can be incorporated and used in various other situations that can take advantage of a searchable data structure that is ordered.

Figure 2:
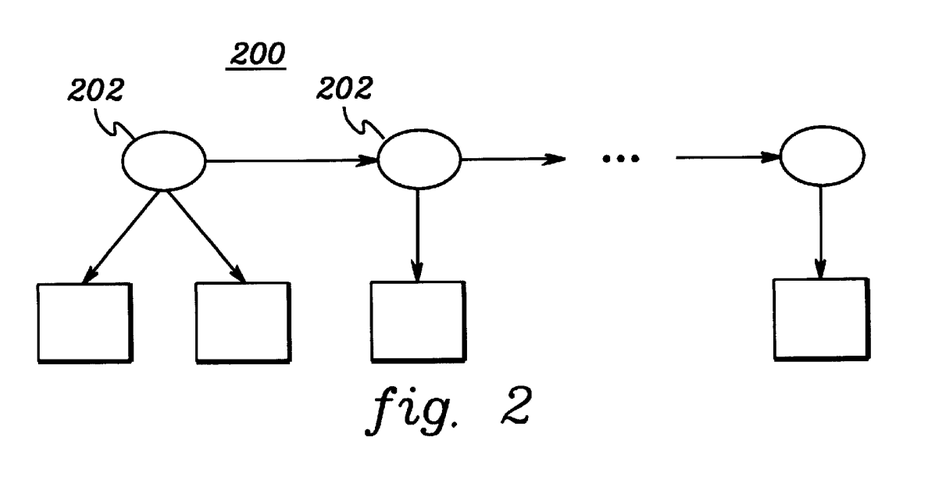
FIG. 2 depicts one example of a data structure of the present invention.

In accordance with the principles of the present invention, a data structure is created that includes a plurality of ordered sub-data structures. One example of a data structure 200 is depicted in FIG. 2. As shown, data structure 200 includes a plurality of sub-data structures 202. The location of a particular sub-data structure in the data structure is dependent on an ordering scheme provided by the present invention. This ordering scheme is described in detail below. In one embodiment, data structure 200 is a tree structure, which includes a plurality of sub-trees (e.g., PATRICIA (Practical Algorithm to Retrieve Information Coded in Alphanumeric) trees).

For ease of understanding of the invention, and for this reason only, the invention is described in terms of a routing mechanism and the data structure is referred to as a routing table. The particular routing mechanism used as the example is as follows: Given a key of an addressable element (e.g., a network address, such as a workstation, host or sub-network address) and a routing table, locate the desired record or records associated with the key. In general, a key is any code of any size expressed in a number of symbols used for the code; there is a simple logical relation between keys that make them bigger or smaller than other keys. As mentioned above, one example of a key is an address. The example will refer to address for simplicity reasons, only.

In one example, the address is represented as a 32-bit word, which is expressed herein in dotted decimal notation. For instance, an address written in binary as thirty-two 1's is written in dotted decimal notation as 255.255.255.255. That is, the 32-bit word is partitioned into four 8-bit bytes and each byte can range from 0 to 255 depending on the address.

Each addressable element (e.g., a host computer) includes its own unique address, and addressable elements can be grouped into one or more groups. Each group of addressable elements has one address. Additionally, associated with each group of addressable elements is a key mask, which is used to qualify a requested key (e.g., an address), as described below. In one example, each key mask is also a 32-bit word. A group of addressable elements associated with one address and a key mask is referred to herein as a subnet. (Keys and key masks can be of any size; 32 bit words is only one example.)

In accordance with the principles of the present invention, the key mask is used to designate variations in an address. In particular, if a bit within the key mask is a binary 0, then an address bit variation is indicated. Conversely, if a bit within the key mask is a binary 1, then no address bit variation is designated. For instance, should an address of 9.130.58.128 be provided along with a key mask of 255.255.255.192, then since 192 includes six 0's when translated into binary (i.e., 11000000), the key mask indicates that there can be 64 ($2^6$=64) variations of the provided address in the last byte. That is, the subnet includes addresses 9.130.58.128 to 9.130.58.191.

The address bit variation can be included in any byte or bytes of the address. For instance, a key mask of 255.255.0.255 indicates variations in the third byte of the address and a key mask of 255.255.254.15 indicates variations in the third and fourth byte of the address. Additionally, an address may have no variations. In this case, the address can be considered a part of a subnet having a key mask of 255.255.255.255.

Each key mask has an associated range, which indicates the degree of specificity of the subnet. For example, a subnet that allows no variations has a key mask range of 1 ($2^0$=1), which indicates the most specific subnet. This subnet includes only exact addresses (e.g., addresses of addressable elements). A subnet that allows some variation (e.g., has a key mask range of 32 ($2^5$=32)) is considered less specific than the subnet having a key mask range of 1, but more specific than a subnet having a key mask range of 64 ($2^6$=64), etc.

The key mask ranges are used, in accordance with the principles of the present invention, to provide an order to the routing table (i.e., to the data structure). In particular, each key mask range is represented in the routing table by a tree (i.e., a sub-data structure) and the trees are coupled to one another (e.g., in a linked list) based on the value of their corresponding key mask range.

For instance, assume a routing table 300 (FIG. 3a) includes three trees 302. Each tree is associated with a corresponding key mask range 304. For example, the first tree has a key mask range of 1, the second tree has a key mask range of 32 and the third tree has a key mask range of 64. As can be seen, the trees are coupled together in ascending order of key mask ranges. That is, the tree roots and their key masks are linked in a list in ascending order of key mask ranges, thus creating an ordered list of trees.

The routing table includes as many trees as there are different key mask ranges. However, each key mask range has one tree. For example, in FIG. 3a, the third tree in ascending order has two key masks associated therewith, each having a range of 64. Each node 306 in the third tree represents the address that was specified with its corresponding key mask. For instance, assume address 9.130.58.128 has a corresponding key mask of 255.255.255.192, then one of the nodes includes address 9.130.58.128. The other node corresponds to the address specified with key mask 255.255.192.255.

Figure 3A:
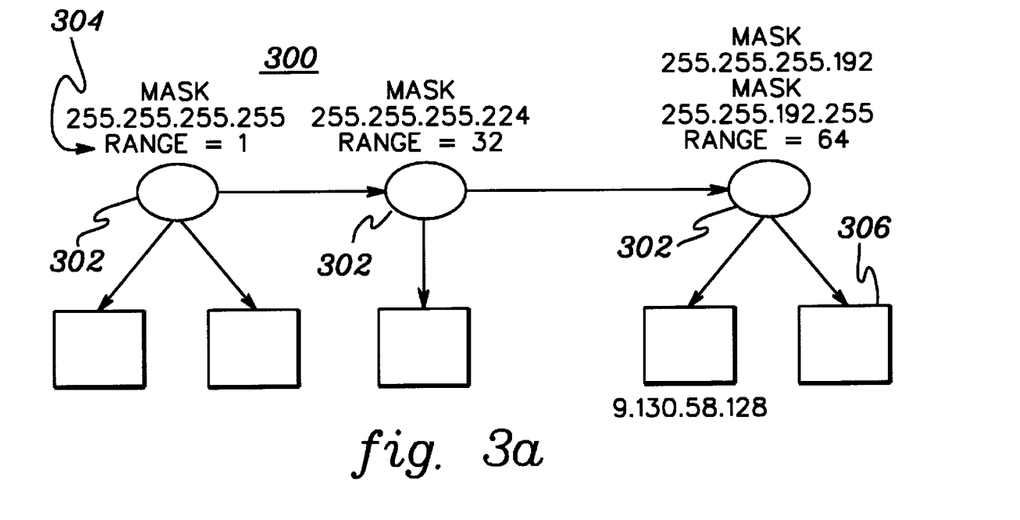
FIGS. 3a–3c depict examples of data structures created and searched in accordance with the principles of the present invention.

The first tree within the routing table has a key mask range of 1, which indicates no variations. This tree includes all the known addresses of the addressable elements, and there is a node for each unique address. This first tree can be said to include a number of degenerate subnets, in which each degenerate subnet is a group of one address with its associated key mask 255.255.255.255.

In one embodiment of the present invention, all of the key masks of the same range are stored in the root of its corresponding tree. For example, root 308 (FIG. 3b) of the tree includes key mask 255.255.255.192 and key mask 255.255.192.255. The non-root nodes of a tree represent the addresses corresponding to the key masks, as described above. Additionally, in one embodiment, each non-root node includes an assignment set, which includes one or more target records that is pertinent to the address of that non-root node. Target records include, for instance, information needed for routing or as another example, information needed when logging on to a particular computer.

Figure 3B:
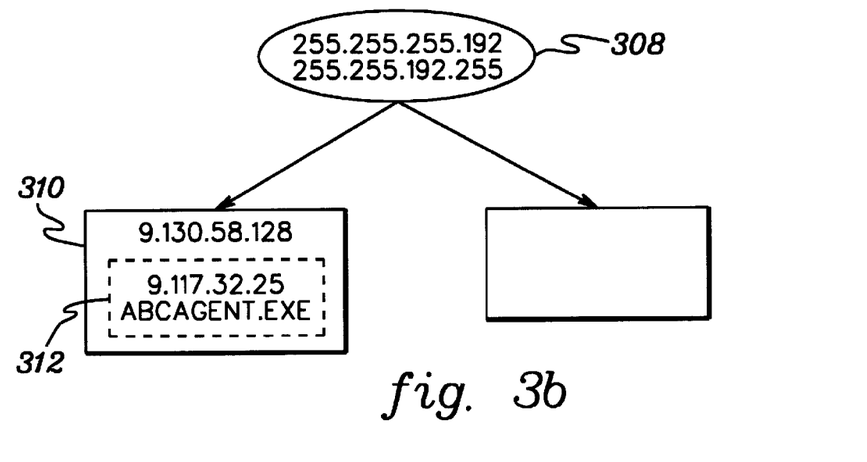

As one example, in FIG. 3b, key mask 255.255.255.192 is associated with subnet address 9.130.58.128, which is stored in node 310. Also, stored in that node are the target records 312 for that address, which include, for instance, a Gateway IP address used in sending an IP packet, and a delivery agent to deliver the packet. It will be apparent to those skilled in the art that in another example, instead of storing the target records at the node, a pointer to the target records is stored instead.

Figure 3C:
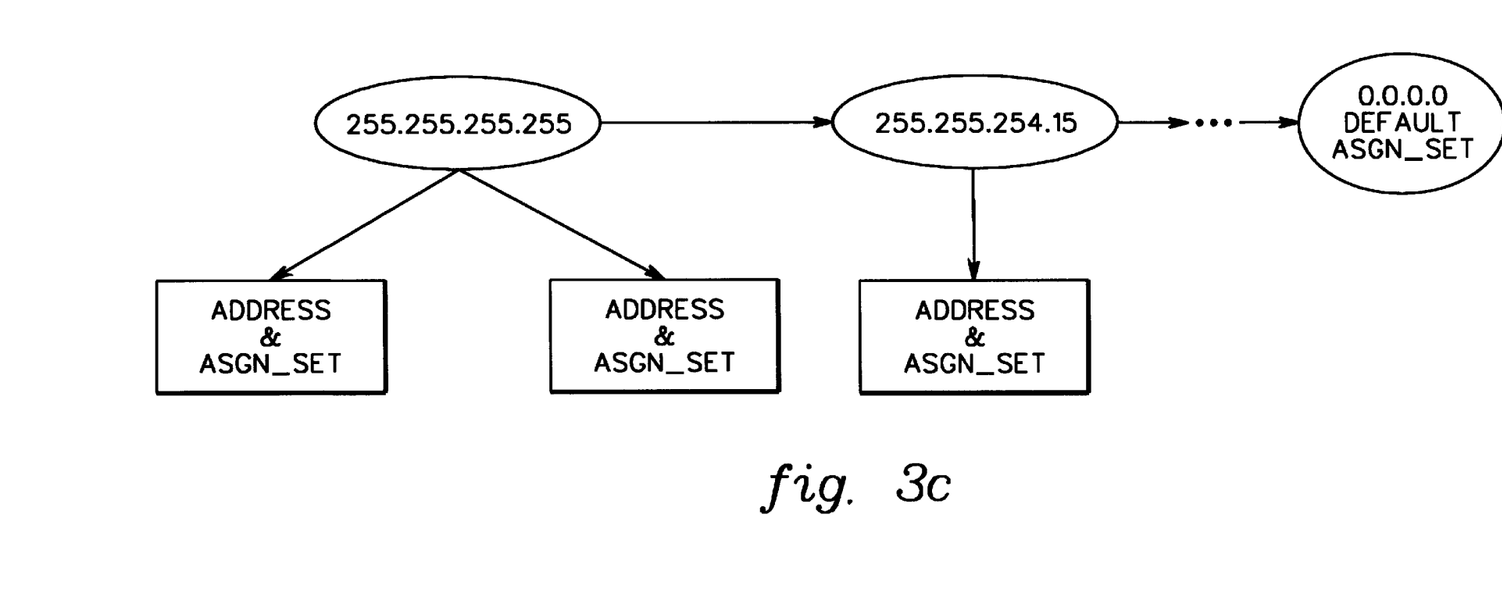

The data structure created in accordance with the principles of the present invention provides target records for every known addressable element (i.e., those having a key mask range of 1) and for every subnet. Additionally, a default subnet is included, which provides target records for addresses that are unknown or do not belong to any known subnet. The default subnet has a default key mask of 0.0.0.0, which has a range of $2^{32}$. Therefore, the tree representing this default subnet would be the last tree in the list. The root node of this tree is degenerate because it does not start any tree. All addresses belong to this tree. The root node of this tree includes a default assignment set for the default target records. One example of a data structure having a default subnet is depicted in FIG. 3c.

In one embodiment of the invention, addressable elements and subnets may be grouped in order to reduce the amount of storage utilized for the assignment sets. In particular, all addressable elements and subnets that use the same set of target records are included in the same Address Group with a unique assignment set. An addressable element, which has an exact address (key mask with a range of 1), can have its own assignment set (e.g., ASGN_SET 1), and it can also be a part of an Address Group that maintains a group assignment set (e.g., ASGN_SET 2). Further, it can be part of different subnets included in other Address Groups.

When searching for target records for the addressable element, the target records should be picked from assignment sets in the following order of preferences:

1. Assignment set of individual addressable element with exact address;
2. Assignment set of Address Group with the exact address;
3. Assignment set of Address Group that contains the most specific subnet;
4. Assignment set of Address Group that contains the next less specific subnet;
5. Etc . . . toward the least specific subnet; and
6. The default assignment set.

The search is complete when all of the target records have been collected or when all of the trees have been examined. Missing target records are picked from the default assignment set. As can be seen from the above listing, assignment set grouping does not change the order in the list of trees. The trees are still searched based on their associated key mask ranges—the most specific trees are searched prior to the least specific trees.

The grouping of addressable elements and subnets does, however, make storing of the assignment sets and their search more complex. For instance, when the data structure is constructed or modified, the following occurs:

(A) Every individual addressable element (i.e., those having an exact address) with its assignment set creates an implicit Address Group;
(B) Every explicitly specified Address Group has one assignment set for all individual addressable elements and subnets that are included within the group;
(C) All Address Groups are organized in, for instance, a linked list or an array in which every individual group can be found by its assigned key; and
(D) Every tree non-root node has two pointers: one to an implicit Address Group of an individual addressable element with its assignment set, and the other to an explicit Address Group with its group assignment set.

Every non-root node in the data structure represents either an individual addressable element or a subnet. The individual addressable elements use both pointers to the Address Groups—one representing the addressable element with its own assignment set and the other representing the addressable element as part of an explicit Address Group with the group assignment set. In one example, one of these pointers may stay null if the addressable element is not included in an Address Group or does not comprise its own Address Group. Other subnets, however, use only the one pointer to the explicit Address Group to which they belong.

In accordance with the principles of the present invention, the data structure (e.g., the routing table) can be dynamically modified by adding keys (e.g., addresses) of addressable elements or subnets to the data structure. One embodiment for inserting into a data structure is described below with reference to FIGS. 4a–4b.

Figure 4A:
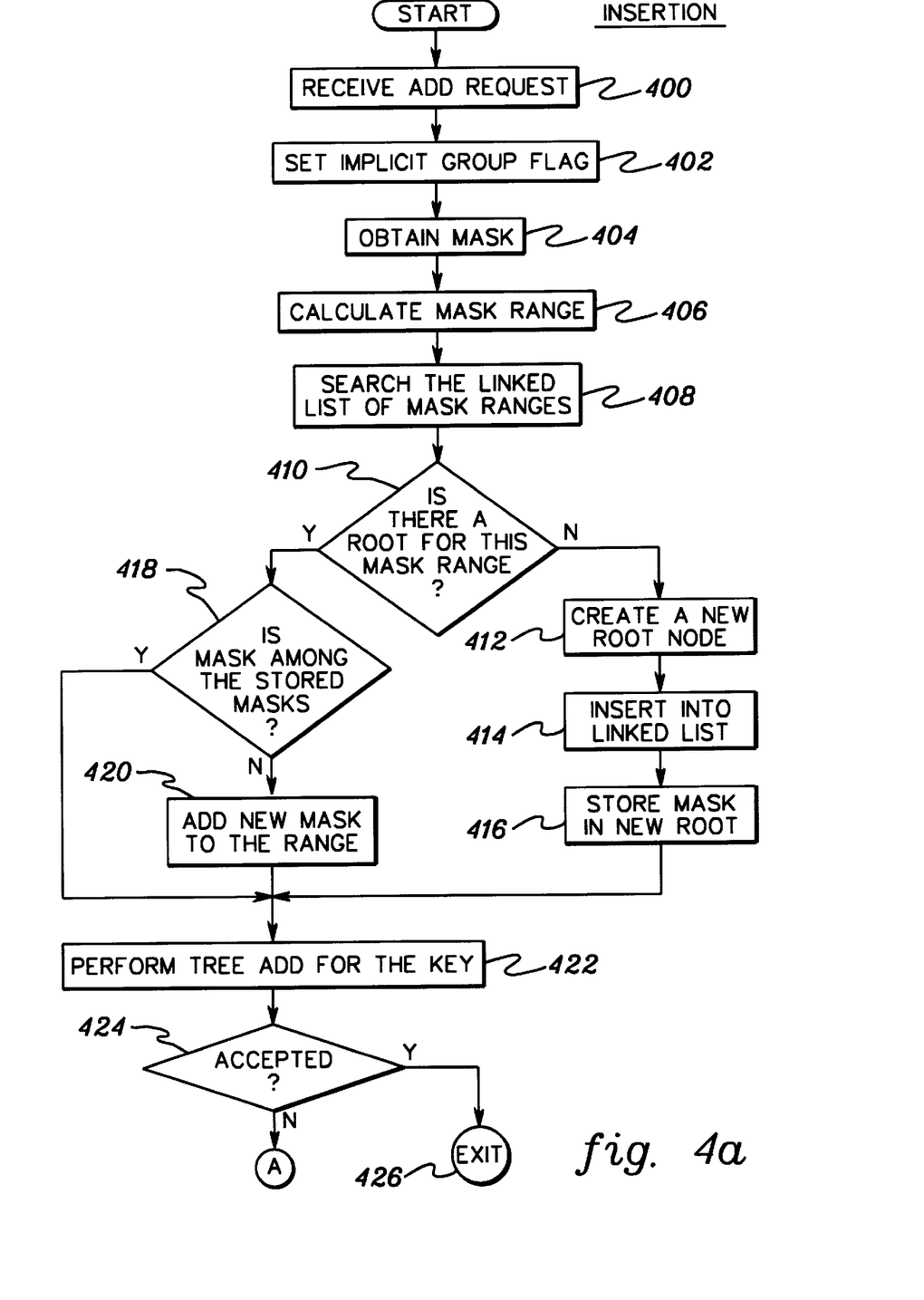
FIGS. 4a–4b depict one embodiment of the logic used to insert a key within a data structure, in accordance with the principles of the present invention.

Initially, an add request is received by a computing unit that will use the request to update the data structure, STEP 400. A request may be received for an individual addressable element or for a subnet. The request includes information, such as a key (e.g., the address), a key mask if the key belongs to a subnet, an indication of whether the key to be added belongs to an implicit Address Group or an explicit Address Group, and the associated assignment set for the Address Group. In the example described herein, the key is an address, and address will be referenced below. However, in other embodiments, the key can be representative of other addressable data.

The information received with the request is used to set an implicit group flag, STEP 402. In particular, the flag is set to Yes (e.g., a binary 1) when the insertion is of an address belonging to an implicit Address Group, and it is set to No (e.g., a binary 0) when the insertion is of an address belonging to an explicit Address Group.

Thereafter, if the address is of a subnet, the key mask is extracted from the request, STEP 404. Otherwise, if the request is for an addressable element, then a key mask of 255.255.255.255 is created, since addressable elements allow no variation.

After obtaining the key mask, the key mask range is calculated, STEP 406. As described above, in one embodiment, the key mask range is calculated by determining how many zeros are located within the key mask when the key mask is written in binary notation. For instance, for a key mask having a value of 255.255.255.255, each 255 is converted to binary (i.e., 11111111), and since there are no zeros in the key mask, the range is 1 ($2^0$=1). If, however, the key mask is, for instance, 255.255.254.15, the binary equivalent yields five zero bits (the 23rd to the 27th bits) and thus, the range is 32 ($2^5$=32).

Subsequent to calculating the key mask range, the data structure is searched to determine if there is a tree root node for this key mask range, STEP 408. Specifically, the key mask range stored within each root node is checked to see if one matches the key mask range just calculated. If the there is no root node for this particular key mask range, INQUIRY 410, then a new root node is created, STEP 412. Thereafter, the new root node is inserted into a linked list of trees (which make up the data structure) according to its range, STEP 414. In particular, the smaller the key mask range, the more specific the subnet is, and the more specific the key mask is, the closer to the beginning of the data structure the subnet is placed. Thus, the data structure starts with the most specific key mask range, range one, and proceeds, for instance, in ascending order of key mask ranges.

After inserting the new root node into the data structure according to its range, the new key mask is stored in the root node, STEP 416.

Returning to INQUIRY 410, if there is a root for this key mask range, then a further determination is made as to whether this particular key mask is among the stored key masks of the found root node, INQUIRY 418. Should the key mask not be included in the stored key masks, then it is added, STEP 420. After the key mask is added to the root node (STEPS 416, 420) or if the key mask is already among the stored key masks (INQUIRY 418), then the key (e.g., the address) is added to the found tree, STEP 422. In one example, this adding is performed by a known PATRICIA add procedure, which is described in detail in, for instance, *Algorithms in C*, by Sedgewick, R., Addison-Wesley Publishing Company, Inc. (1990), which is hereby incorporated herein by reference in its entirety.

Figure 4B:
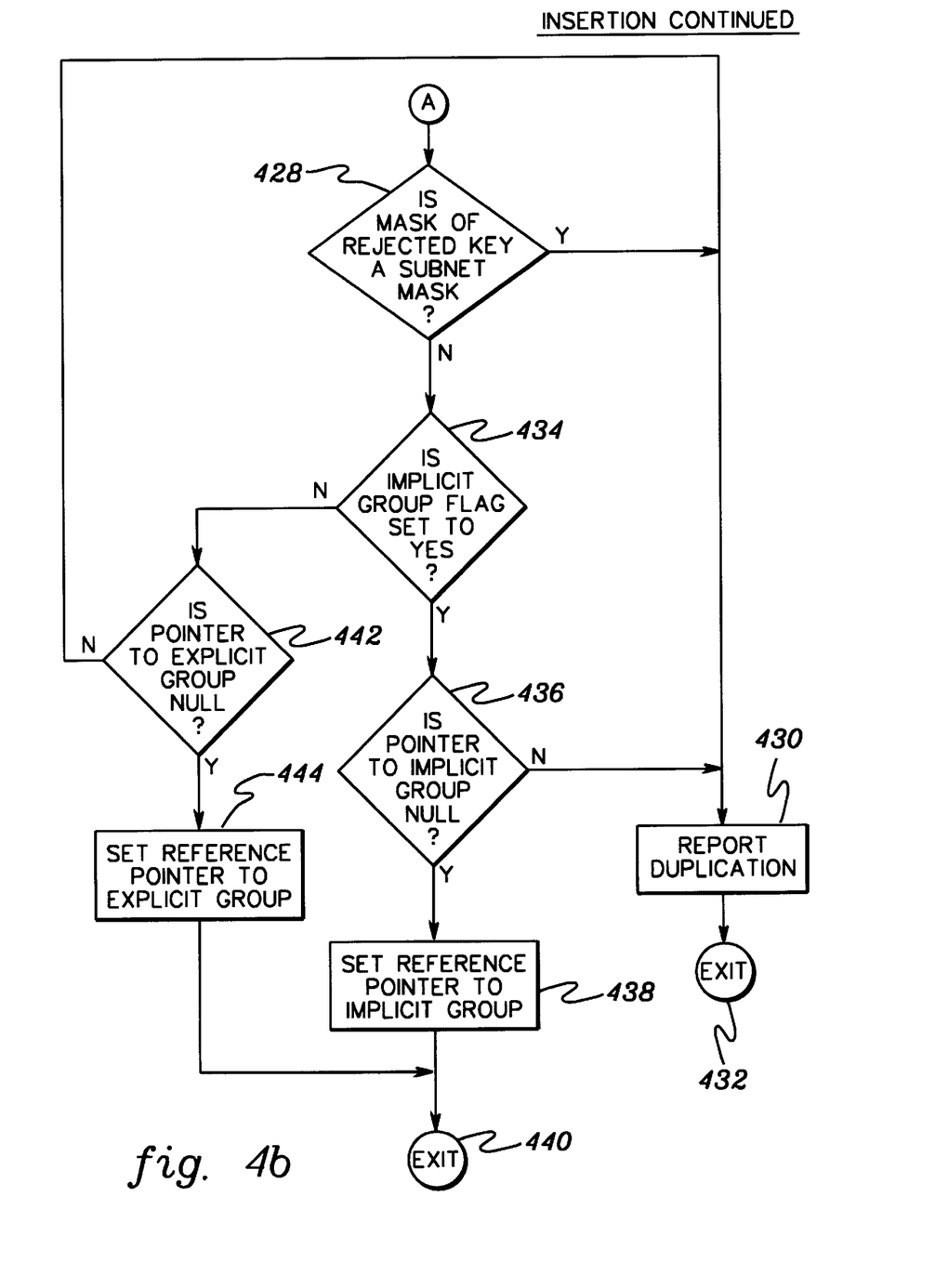

Thereafter, a determination is made as to whether the add was successful, INQUIRY 424. If the add was successful, then the insertion is complete, STEP 426. However, if the add was rejected, a further determination is made as to whether the key mask of the rejected key is a subnet key mask, INQUIRY 428 (FIG. 4b). Should the key mask be a subnet key mask, then the key has already been added to the tree, so the requester of the addition receives a report of a duplication error, STEP 430. Thereafter, the insertion procedure is complete, STEP 432.

On the other hand, if the key mask is not a subnet key mask, INQUIRY 428, then a further determination is made as to whether the implicit group flag is set to Yes, INQUIRY 434. Should the implicit group flag be set to Yes, then a check is made to determine if the found tree node has a pointer reference to the implicit Address Group that is not null, INQUIRY 436. If so, a duplication error is reported, STEP 430, and insertion is complete, STEP 432. If, however, the pointer to the implicit Address Group is null, then the reference pointer in the tree node is set to the implicit Address Group, STEP 438. Thereafter, insertion is complete, STEP 440.

Returning to INQUIRY 434, if the implicit group flag is set to No, then a determination is made as to whether the pointer in the node to the explicit Address Group is null, INQUIRY 442. If it is not null, then duplication is reported once again, STEP 430, and insertion is complete, STEP 432. However, if the pointer to the explicit Address Group is null, then the reference pointer in the tree node is set to that explicit Address Group, STEP 444, and insertion is complete, STEP 440.

In the above embodiment, it is assumed that a key duplication is not allowed. However, some techniques may choose to treat a key duplication as a valid replacement request.

In accordance with the principles of the present invention, old records of the data structure can be removed upon request. In particular, a request to remove a record is sent to a computing unit that performs a delete procedure. One embodiment for removing records is described in detail with reference to FIGS. 5a–5b.

Figure 5A:
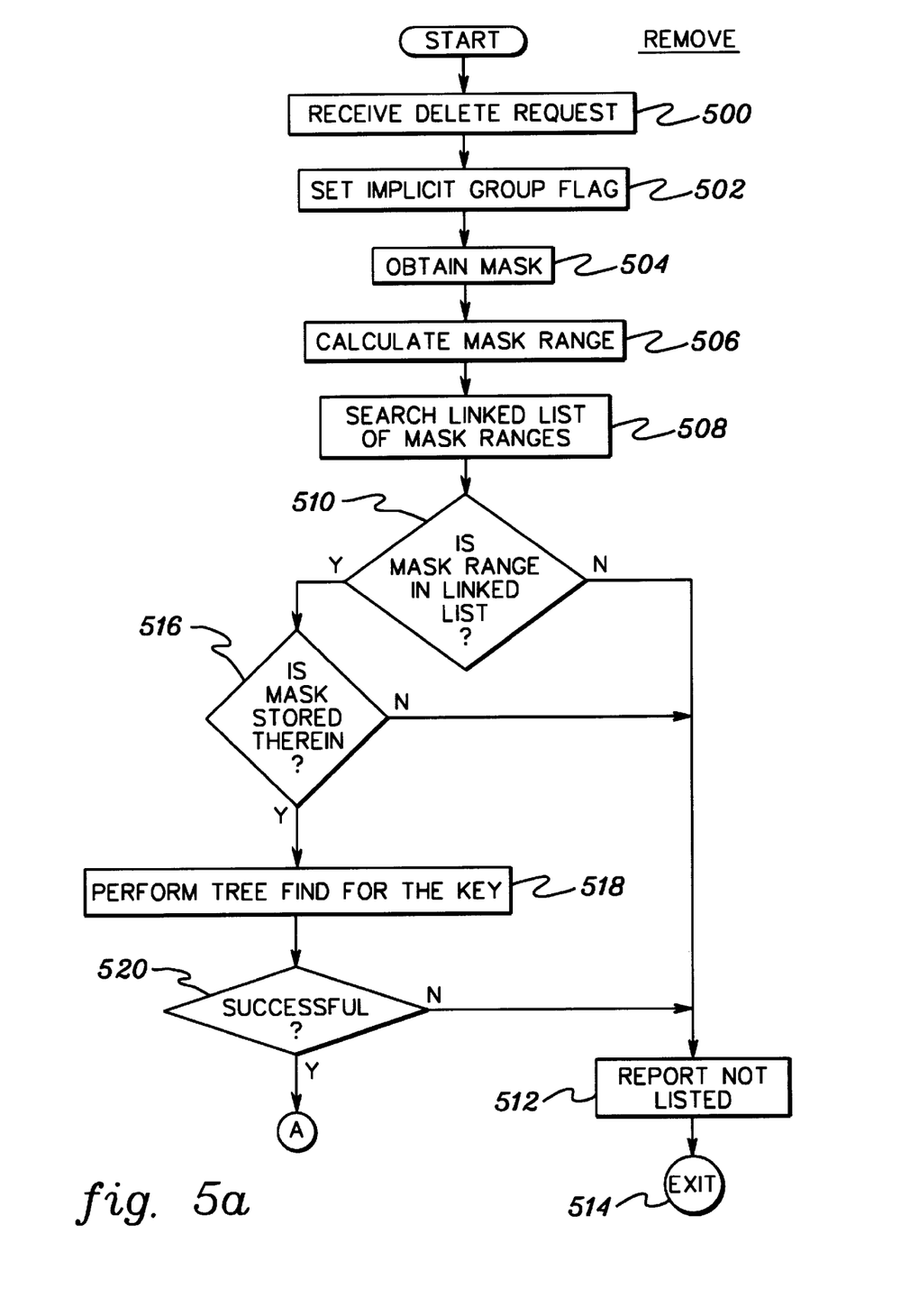
FIGS. 5a–5b depict one embodiment of the logic used to remove a key from a data structure, in accordance with the principles of the present invention.

Initially, a delete request for a specific addressable element or for a subnet of an Address Group is received, STEP 500. The request includes various information including, for instance, the key, a key mask if the key belongs to a subnet and an indication of whether the key to be removed belongs to an implicit Address Group or an explicit Address Group.

Subsequent to receiving the delete request, the information received with the request is used to set the implicit group flag, STEP 502. In particular, the flag is set to Yes (e.g., a binary 1) when the deletion is of an address belonging to an implicit Address Group, and it is set to No (e.g., a binary 0) when the deletion is of an address belonging to an explicit Address Group.

Thereafter, if the address is of a subnet, the key mask is extracted from the request, STEP 504. Otherwise, if the request is for an individual addressable element, a key mask is created, as described above. After obtaining the key mask, the key mask range is calculated, STEP 506, in the manner described above.

Subsequently, the linked list of tree root nodes and key masks is searched in an attempt to locate the tree root node that keeps this key mask range in the linked list, STEP 508.

Should the key mask range not be within the search data structure, INQUIRY 510, then the requester of the delete is notified that the key is not listed, STEP 512, and the delete procedure is complete, STEP 514.

If, however, the key mask range is within the search data structure, INQUIRY 510, then a further determination is made as to whether the particular key mask is stored within that range, INQUIRY 516. If the key mask is not stored within the range, then once again, a report is provided indicating that the key to be deleted is not there, STEP 512.

On the other hand, if the key mask is stored within the range, then a find procedure is used to locate the key in the found tree, STEP 518. In one embodiment, the find procedure is a PATRICIA find procedure, which is described in detail in, for instance, *Algorithms in C*, by Sedgewick, R., Addison-Wesley Publishing Company, Inc. (1990), which is hereby incorporated herein by reference in its entirety.

Figure 5B:
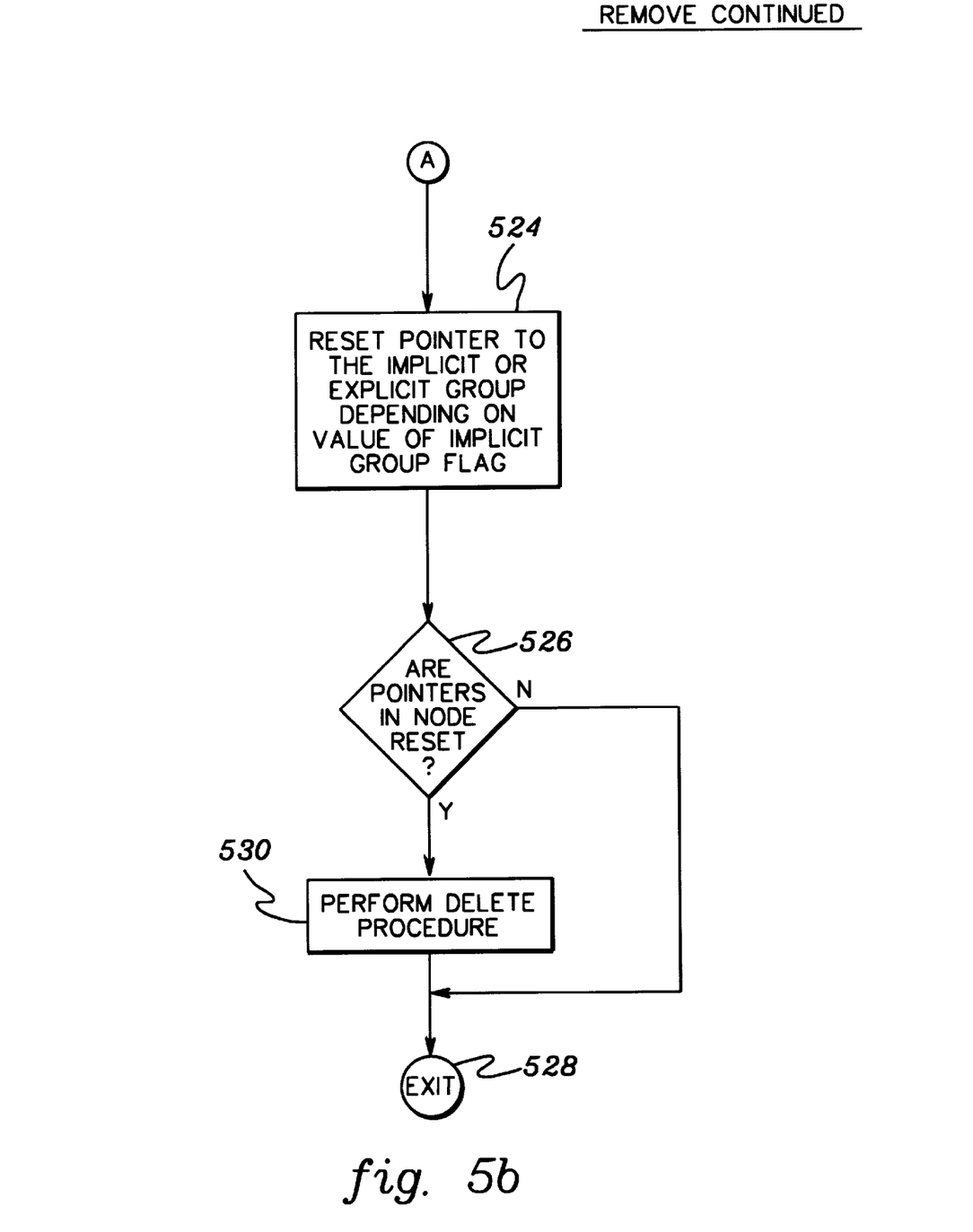

Should the find be unsuccessful, INQUIRY 520, then once again a report is provided indicating that the record is not listed, STEP 512. However, if the find is successful, then the pointer to the implicit or explicit Address Group is reset depending on the value of the implicit group flag, STEP 524.

Thereafter, a check is made to determine whether the pointers in the node to the implicit and explicit Address Groups are reset, INQUIRY 526. If both pointers are not reset, then the key is not deleted and the removal procedure is complete, STEP 528. However, if both pointers in the node are reset, then a delete procedure is performed in order to delete the node in the found tree, STEP 530. In one example, the delete procedure includes setting a bit indicating that the node is to be ignored in future searching of the tree. In another embodiment, a PATRICIA delete procedure may be used. Upon deletion, the user's storage for the key and its associated assignment set are considered vacated and can be released. Thereafter, the deletion procedure is complete, STEP 528.

In addition to inserting and removing keys from the data structure, the data structure can be searched to find target records associated with a key. In particular, when a request comes in, a look-up procedure is performed in the data structure to locate the specific key in the request. When the key is located (either as an exact key or part of a subnet), the look-up procedure returns the desired target records specific for the provided key. The target records are picked in the order from most to least specific assignment sets. Collected target records are not necessarily picked from one assignment set. Instead, they are first picked from the most specific assignment set, then if this assignment set does not provide all target records, a less specific assignment set is chosen to look for any omissions. This process is continued until all of the target records are selected.

Figure 6:
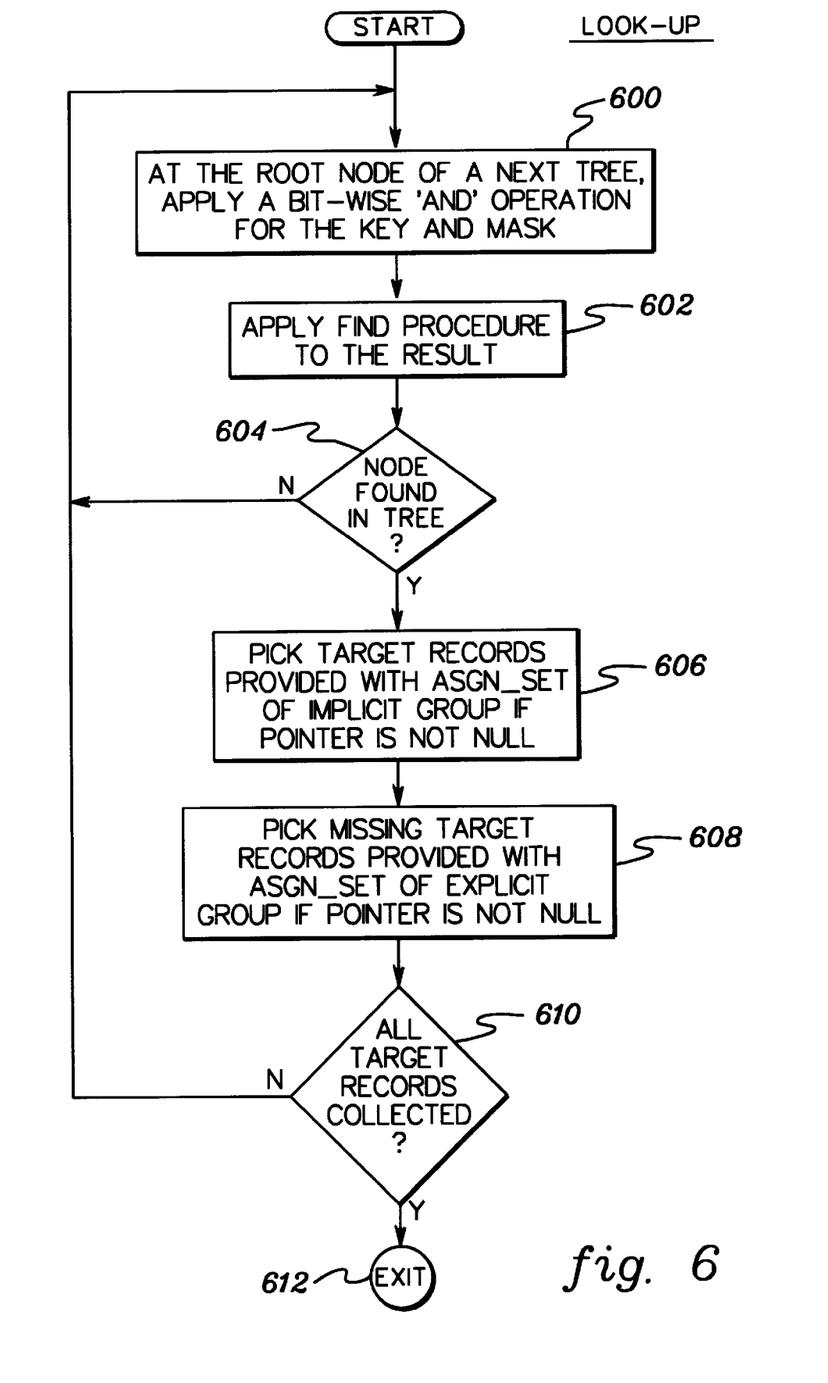
FIG. 6 depicts one embodiment of the logic used to look-up a key in a data structure, in accordance with the principles of the present invention.

One embodiment of a look-up procedure is depicted in FIG. 6 and described in detail herein. Initially, the look-up procedure begins at the first root node in the data structure. This is referred to herein as the host tree root. At the tree root, a bit-wise AND operation is performed for the key and the key mask, STEP 600. The result of the bit-wise ANDing of the key with the key mask is then used to search the host tree to find the non-root node corresponding to the ANDed key, STEP 602. In one example, the search uses a PATRICIA find procedure, which is described in, for instance, *Algorithms in C*, by Sedgewick, R., Addison-Wesley Publishing Company, Inc. (1990), which is hereby incorporated herein by reference in its entirety.

If the non-root node is not found in the tree, INQUIRY 604, then the logic proceeds to the next tree in the ordered list, STEP 600, and the procedure is repeated at the root node of the next tree. If, however, the non-root node is found in the tree being searched, then if the implicit group pointer in the found node is not null, all of the target records provided with the assignment set of the implicit Address Group pointed to by the implicit group pointer are selected, STEP 606. Additionally, if the explicit pointer located in the found node is not null, any missing target records are selected from the assignment set pointed to by the explicit pointer, STEP 608.

If all of the target records are collected, INQUIRY 610, then the look-up procedure is complete, STEP 612. If, however, there are more target records to be collected (it is known in advance what target records are needed), then the process repeats at the root node of the next tree in the ordered list, STEP 600. Eventually, all of the target records will be collected. If they are not collected prior to reaching the default assignment set, the default assignment set provides any missing records.

Described in detail above are examples of techniques for adding, deleting and searching a data structure constructed in accordance with the principles of the present invention. Variations to these procedures are possible without departing from the spirit of the present invention. For example, in some cases, it may be desirable to replace target records for a given key (e.g., when keys are removed and added to the data structure with new target records often). In those cases, key duplication would not be considered an error, but instead would be treated as a replacement call. This saves a node removal prior to adding the same key with the new target records.

As another example, in systems where the contents of the data structure (e.g., the routing table) change frequently, it is desirable not to remove the user's storage allocated for the key and its target records after deletion from the tree. PATRICIA, for instance, keeps virtually deleted internal nodes around until a threshold is reached. In this case, when a new key is to be added, it is highly probable that the virtually deleted internal node for this key is still in storage. It points to the user's area of storage where the new key and its target records are to be stored. The PATRICIA add function may have a special option to cover the case when a virtually deleted node is found in the tree. This saves on new storage allocation and on duplicate searches when adding keys.

Additionally, in another example, the data structure can be reconstructed at various times, as described herein. The PATRICIA delete procedure deletes internal nodes virtually. That is, nodes are not deleted from the tree until a threshold is reached. To the user, however, the node is removed from the data structure when the deletion call is made. Each node in the data structure is associated with a deferred-deletion bit to indicate whether the node is logically in the data structure or not. When the threshold, which is set by the user, is reached, the entire data structure is reconstructed. If the elements of the data structure are not removed often, it is suggested to use a small threshold value. On the other hand, if the data structure changes often, then this threshold should be high to avoid frequent data structure reconstruction.

Described in detail above are embodiments for creating, modifying and searching an ordered data structure. In one example, the ordered data structure can be used for routing, such as packet routing for the Internet Protocol. Described below is one example based on a routing mechanism. It demonstrates for a particular example what would be included in a routing table and how it would be searched. In the example below, two target records are provided with each addressable element address and each subnet address, as follows: (1) A Gateway IP address designating where to send an IP packet; and (2) A delivery agent (application name) to perform the delivery.

Assume for this example the following target records are provided with the following addresses (i.e., keys):

| | |
|---|---|
| 9.117.32.29 | Gateway - 9.117.32.253 |
| | Agent - not provided |
| 9.130.58.160 | Gateway - 9.130.58.254 |
| | Agent - 'ABCAGENT.EXE' |
| 9.130.58.128::255.255.255.192 | Gateway - 9.130.0.254 |
| | Agent - not provided |
| 9.0.0.0::255.0.0.0 | Gateway - not provided |
| | Agent - 'XYZAGENT.EXE' |

Default records for this example routing table include:

Default Gateway—9.1.1.253

Default Agent—'IPAGENT.EXE'

Based on the above information, four sub-data structures are created for the data structure (e.g., the routing table), including:

1. A first sub-data structure having a key mask range of 1. Two nodes are created in this sub-data structure, one for each of the keys:
   a) 9.117.32.29
   b) 9.130.58.160

Each node has the target records, as indicated above.

2. A second sub-data structure for key mask 255.255.255.192, in which the key mask range is $2^6$=64. One node is created in this sub-data structure for the key 9.130.58.128 with its target records.

3. A third sub-data structure for key mask 255.0.0.0, in which the key mask range is $2^{24}$=16777216. One node is created in this sub-data structure for key 9.0.0.0 with its target records.

4. A default sub-data structure for key mask 0.0.0.0 is created with the default target records.

The examples listed below are based on the ordered data structure described above.

Case 1: IP packet arrives for the workstation with an IP address of 9.130.58.160.

| | |
|---|---|
| Step 1 | Start the search. |
| Step 2 | Key 9.130.58.160 is found in the first sub-data structure (referred to herein as the host tree). Thus, the following target records are picked: Gateway '9.130.58.254' Agent 'ABCAGENT.EXE' |
| Step 3 | All two target records are set. Go to Step 4. |
| Step 4 | Pass the packet to agent ABCAGENT.EXE to deliver it to Gateway 9.130.58.254. |

Case 2: IP packet arrives for the workstation with an IP address of 9.130.58.174.

| | |
|---|---|
| Step 1 | Start the search. |
| Step 2 | The address is not found in the host tree. |
| Step 3 | Next key mask is 255.255.255.192. |

| | |
|---|---|
| | An 'AND' operation with this key mask and the address gives: 9.130.58.128. This key is found in the tree for key mask 255.255.255.192, and thus, the one target record for Gateway, which is 9.130.0.254, is selected. The Agent record is not defined with this key. |
| Step 4 | Agent target record is left unknown. |
| Step 5 | Next key mask is 255.0.0.0. An 'AND' operation with this key mask gives: 9.0.0.0. The node in the tree is found for key mask 255.0.0.0. The target record 'Gateway' is ignored because it is already picked, and one target record 'Agent' is picked, which is XYZAGENT.EXE. |
| Step 6 | All target records are picked. Go to Step 7. |
| Step 7 | Pass the packet to Agent XYZAGENT.EXE to deliver it to Gateway 9.130.0.254. |

Case 3: IP packet arrives for 9.117.88.99.

| | |
|---|---|
| Step 1 | Start the search. |
| Step 2 | It is not found in the host tree. |
| Step 3 | Next key mask is 255.255.255.192. An 'AND' operation with this key mask and the address gives 9.117.88.0, which is not found in the tree. |
| Step 4 | Next key mask is 255.0.0.0. An 'AND' operation with this key mask gives 9.0.0.0. This key is found in the tree for key mask 255.0.0.0. The record for Gateway is not provided, so only the record for Agent is picked, which is 'XYZAGENT.EXE'. |
| Step 5 | Gateway target record is left unknown. |
| Step 6 | Next root node is a default node without any tree. So, simply pick missing Gateway record 9.1.1.253. |
| Step 7 | All target records are picked. Go to Step 8. |
| Step 8 | Pass the packet to agent XYZAGENT.EXE to deliver it to gateway 9.1.1.253. |

Case 4: IP packet arrives for 128.226.1.2.

| | |
|---|---|
| Step 1 | Start the search. |
| Step 2 | The address is not found in the host tree. |
| Step 3 | Next key mask is 255.255.255.192. An 'AND' operation with this key mask gives a result 128.226.1.0, which is not in the tree. |
| Step 4 | Next key mask is 255.0.0.0. An 'AND' operation with this key mask gives a result 128.0.0.0., which is not found in the tree. |
| Step 5 | Next root node is a default node without any tree. So both missing records are simply selected: |

| | |
|---|---|
| | Gateway record '9.1.1.253'<br>Agent record IPAGENT.EXE |
| Step 6 | All target records are picked. Go to Step 7. |
| Step 7 | Pass the packet to agent IPAGENT.EXE to deliver it to Gateway 9.1.1.253. |

Described in detail above is a data structure that is ordered based on ranges of key masks associated with sub-data structures of the data structure. (The sub-data structures can be, for instance, created or provided (i.e., obtained).) In one embodiment, the ordering is an ascending order of key mask ranges. That is, tree roots and their key masks are linked in a list in ascending order of key mask ranges, thus, creating an ordered list of trees. This ordered list of trees advantageously provides an efficient search technique to locate the best match for a given key, when no exact match is available. Further, it enables traversal of the data structure in ascending (or descending) order.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of creating a data structure in a computing environment, said method comprising:
obtaining a plurality of sub-data structures; and
ordering said plurality of sub-data structures based on ranges of key masks associated with said plurality of sub-data structures, wherein said data structure comprises said ordered plurality of sub-data structures.

2. The method of claim 1, wherein said ordering comprises ordering said plurality of sub-data structures based on an ascending order of said ranges of key masks.

3. The method of claim 2, wherein said ordering comprises linking said plurality of sub-data structures in a linked list in ascending order of said ranges of key masks.

4. The method of claim 1, wherein a sub-data structure of said plurality of sub-data structures represents at least one group of one or more keys, and wherein any group associated with said sub-data structure has the same range of key mask as any other group that may be associated with said sub-data structure.

5. The method of claim 1, further comprising determining said ranges of key masks associated with said plurality of sub-data structures.

6. The method of claim 5, wherein said determining comprises for a key mask associated with a sub-data structure:
converting said key mask into a binary notation; and
counting a number of zeros within said binary notation, said number of zeros providing an indication of the range of said key mask.

7. The method of claim 6, wherein said range of said key mask is two to the power of said number of zeros.

8. The method of claim 1, wherein said plurality of sub-data structures comprises a plurality of trees.

9. The method of claim 8, wherein said plurality of trees comprises a plurality of PATRICIA trees.

10. The method of claim 1, further comprising adding another sub-data structure to said data structure, wherein said another sub-data structure is inserted in order in said data structure based on its key mask range.

11. The method of claim 1, further comprising inserting a new key into said data structure.

12. The method of claim 11, wherein said inserting comprises:
determining a key mask range for said new key;
creating a new sub-data structure when said key mask range is not within said data structure;
adding a key mask associated with said new key to an existing sub-data structure when said key mask range is within said data structure and said key mask is not among the key masks of said existing sub-data structure; and
adding said new key to said new sub-data structure or said existing sub-data structure.

13. The method of claim 1, further comprising removing one of said plurality of sub-data structures.

14. The method of claim 1, wherein said plurality of sub-data structures includes a plurality of keys, and wherein said method further comprises removing one key of said plurality of keys from one sub-data structure of said plurality of sub-data structures.

15. The method of claim 14, wherein said removing comprises using a key mask range of said one key to be removed to locate said one sub-data structure.

16. The method of claim 1, further comprising searching said data structure.

17. The method of claim 16, wherein said searching comprises searching said data structure for one or more target records associated with a requested key, said searching beginning with a more specific sub-data structure of said plurality of sub-data structures and proceeding to less specific sub-data structures of said plurality of sub-data structures until said one or more target records is collected.

18. The method of claim 16, wherein said searching comprises:
determining whether a requested key belongs to a sub-data structure of said ordered plurality of sub-data structures, said determining beginning with a first sub-data structure of said ordered plurality of sub-data structures;
selecting one or more target records associated with said requested key from said sub-data structure, when said requested key belongs to said sub-data structure;
deciding whether one or more target records is still needed for said requested key;
proceeding to a next sub-data structure of said ordered plurality of sub-data structures when said one or more target records is still needed for said requested key;
repeating said determining, selecting, and deciding at said next sub-data structure and said proceeding until no more target records are needed for said requested key.

19. The method of claim 18, wherein said determining comprises performing a bit wise AND operation with said requested key and a key mask of said sub-data structure to determine whether said requested key belongs to said sub-data structure.

20. The method of claim 1, wherein said key masks designate variations in keys of said sub-data structures.

21. The method of claim 20, wherein said keys comprise addresses.

22. The method of claim 1, wherein said obtaining comprises defining said plurality of sub-data structures.

23. The method of claim 1, wherein each sub-data structure of said plurality of sub-data structures has associated therewith one or more addresses.

24. The method of claim 23, wherein each of said one or more addresses has a corresponding key mask.

25. The method of claim 1, wherein each sub-data structure of said plurality of sub-data structures has associated therewith a key mask range.

26. A memory comprising a data structure, said data structure comprising a plurality of sub-data structures ordered based on ranges of key masks associated with said plurality of sub-data structures.

27. The memory of claim 26, wherein said plurality of sub-data structures are linked in a linked list in ascending order of said ranges of key masks.

28. The memory of claim 26, wherein said key masks designate variations in keys of said sub-data structures.

29. The memory of claim 28, wherein said keys comprise addresses.

30. The memory of claim 26, wherein each sub-data structure of said plurality of sub-data structures has associated therewith one or more addresses.

31. The memory of claim 30, wherein each of said one or more addresses has a corresponding key mask.

32. The memory of claim 26, wherein each sub-data structure of said plurality of sub-data structures has associated therewith a key mask range.

33. At least one program storage device readable by a machine, tangibly embodying at least one program of instructions executable by the machine to perform a method of creating a data structure, said method comprising:
obtaining a plurality of sub-data structures; and
ordering said plurality of sub-data structures based on ranges of key masks associated with said plurality of sub-data structures, wherein said data structure comprises said ordered plurality of sub-data structures.

34. The at least one program storage device of claim 33, wherein said ordering comprises ordering said plurality of sub-data structures based on an ascending order of said ranges of key masks.

35. The at least one program storage device of claim 33, wherein a sub-data structure of said plurality of sub-data structures represents at least one group of one or more keys, and wherein any group associated with said sub-data structure has the same range of key mask as any other group that may be associated with said sub-data structure.

36. The at least one program storage device of claim 33, wherein said method further comprises determining said ranges of key masks associated with said plurality of sub-data structures.

37. The at least one program storage device of claim 36, wherein said determining comprises for a key mask associated with a sub-data structure:

converting said key mask into a binary notation; and counting a number of zeros within said binary notation, said number of zeros providing an indication of the range of said key mask.

38. The at least one program storage device of claim 37, wherein said range of said key mask is two to the power of said number of zeros.

39. The at least one program storage device of claim 33, wherein said plurality of sub-data structures comprises a plurality of trees.

40. The at least one program storage device of claim 33, wherein said method further comprises adding another sub-data structure to said data structure, wherein said another sub-data structure is inserted in order in said data structure based on its key mask range.

41. The at least one program storage device of claim 33, wherein said method further comprises inserting a new key into said data structure.

42. The at least one program storage device of claim 41, wherein said inserting comprises:

determining a key mask range for said new key;

creating a new sub-data structure when said key mask range is not within said data structure;

adding a key mask associated with said new key to an existing sub-data structure when said key mask range is within said data structure and said key mask is not among the key masks of said existing sub-data structure; and adding said new key to said new sub-data structure or said existing sub-data structure.

43. The at least one program storage device of claim 33, wherein said method further comprises removing one of said plurality of sub-data structures.

44. The at least one program storage device of claim 33, wherein said plurality of sub-data structures includes a plurality of keys, and wherein said method further comprises removing one key of said plurality of keys from one sub-data structure of said plurality of sub-data structures.

45. The at least one program storage device of claim 44, wherein said removing comprises using a key mask range of said one key to be removed to locate said one sub-data structure.

46. The at least one program storage device of claim 33, further comprising searching said data structure.

47. The at least one program storage device of claim 46, wherein said searching comprises searching said data structure for one or more target records associated with a requested key, said searching beginning with a more specific sub-data structure of said plurality of sub-data structures and proceeding to less specific sub-data structures of said plurality of sub-data structures until said one or more target records is collected.

48. The at least one program storage device of claim 46, wherein said searching comprises:

determining whether a requested key belongs to a sub-data structure of said ordered plurality of sub-data structures, said determining beginning with a first sub-data structure of said ordered plurality of sub-data structures;

selecting one or more target records associated with said requested key from said sub-data structure, when said requested key belongs to said sub-data structure;

deciding whether one or more target records is still needed for said requested key;

proceeding to a next sub-data structure of said ordered plurality of sub-data structures when said one or more target records is still needed for said requested key;

repeating said determining, selecting, and deciding at said next sub-data structure and said proceeding until no more target records are needed for said requested key.

49. The at least one program storage device of claim 48, wherein said determining comprises performing a bit wise AND operation with said requested key and a key mask of said sub-data structure to determine whether said requested key belongs to said sub-data structure.

50. The at least one program storage device of claim 33, wherein said key masks designate variations in keys of said sub-data structures.

51. The at least one program storage device of claim 50, wherein said keys comprise addresses.

52. The at least one program storage device of claim 33, wherein said obtaining comprises defining said plurality of sub-data structures.

53. The at least one program storage device of claim 33, wherein each sub-data structure of said plurality of sub-data structures has associated therewith one or more addresses.

54. The at least one program storage device of claim 53, wherein each of said one or more addresses has a corresponding key mask.

55. The at least one program storage device of claim 33, wherein each sub-data structure of said plurality of sub-data structures has associated therewith a key mask range.

56. An article of manufacture, comprising:

at least one computer useable medium having computer readable program code means embodied therein for causing the creating of a data structure, the computer readable program code means in said article of manufacture comprising:

computer readable program code means for causing a computer to obtain a plurality of sub-data structures; and computer readable program code means for causing a computer to order said plurality of sub-data structures based on ranges of key masks associated with said plurality of sub-data structures, wherein said data structure comprises said ordered plurality of sub-data structures.

57. The article of manufacture of claim 56, further comprising computer readable program code means for causing a computer to determine said ranges of key masks associated with said plurality of sub-data structures.

58. The article of manufacture of claim 56, further comprising computer readable program code means for causing a computer to add another sub-data structure to said data structure, wherein said another sub-data structure is inserted in order in said data structure based on its key mask range.

59. The article of manufacture of claim 56, further comprising computer readable program code means for causing a computer to perform at least one of inserting a new key into said data structure and removing one of said plurality of sub-data structures.

60. The article of manufacture of claim 56, wherein said plurality of sub-data structures includes a plurality of keys, and further comprising computer readable program code means for causing a computer to remove one key of said plurality of keys from one sub-data structure of said plurality of sub-data structures.

61. The article of manufacture of claim 56, further comprising computer readable program code means for causing a computer to search said data structure.

62. The article of manufacture of claim 56, wherein said key masks designate variations in keys of said sub-data structures.

63. The article of manufacture of claim 62, wherein said keys comprise addresses.

64. The article of manufacture of claim 56, wherein said computer readable program code means for causing a computer to obtain comprises computer readable program code means for causing a computer to define said plurality of sub-data structures.

65. The article of manufacture of claim 56, wherein each sub-data structure of said plurality of sub-data structures has associated therewith one or more addresses.

66. The article of manufacture of claim 65, wherein each of said one or more addresses has a corresponding key mask.

67. The article of manufacture of claim 56, wherein each sub-data structure of said plurality of sub-data structures has associated therewith a key mask range.

68. A system of creating a data structure, said system comprising:

a plurality of sub-data structures; and means for ordering said plurality of sub-data structures based on ranges of key masks associated with said plurality of sub-data structures, wherein said data structure comprises said ordered plurality of sub-data structures.

69. The system of claim 68, further comprising means for determining said ranges of key masks associated with said plurality of sub-data structures.

70. The system of claim 68, further comprising means for adding another sub-data structure to said data structure, wherein said another sub-data structure is inserted in order in said data structure based on its key mask range.

71. The system of claim 68, further comprising at least one of means for inserting a new key into said data structure and means for removing one of said plurality of sub-data structures.

72. The system of claim 68, wherein said plurality of sub-data structures includes a plurality of keys, and wherein said system further comprises means for removing one key of said plurality of keys from one sub-data structure of said plurality of sub-data structures.

73. The system of claim 68, further comprising means for searching said data structure.

74. The system of claim 73, wherein said means for searching comprises means for searching said data structure for one or more target records associated with a requested key, said searching beginning with a more specific sub-data structure of said plurality of sub-data structures and proceeding to less specific sub-data structures of said plurality of sub-data structures until said one or more target records is collected.

75. The system of claim 68, wherein said key masks designate variations in keys of said sub-data structures.

76. The system of claim 75, wherein said keys comprise addresses.

77. The system of claim 68, further comprising means for defining said plurality of sub-data structures.

78. The system of claim 68, wherein each sub-data structure of said plurality of sub-data structures has associated therewith one or more addresses.

79. The system of claim 78, wherein each of said one or more addresses has a corresponding key mask.

80. The system of claim 68, wherein each sub-data structure of said plurality of sub-data structures has associated therewith a key mask range.

81. A method of creating a data structure in a computing environment, said method comprising:

obtaining a plurality of sub-data structures; and providing a key mask range for each sub-data structure of said plurality of sub-data structures, wherein said data structure comprises said plurality of sub-data structures.

82. The method of claim 81, wherein each sub-data structure comprises a PATRICIA tree.

83. The method of claim 81, wherein each key mask range is associated with one or more key masks, said key masks designating variations in keys of said sub-data structures.

84. The method of claim 83, wherein said keys comprise addresses.

85. The method of claim 81, wherein said obtaining comprises defining a plurality of sub-data structures.

86. The method of claim 81, wherein each sub-data structure of said plurality of sub-data structures has associated therewith one or more addresses.

87. The method of claim 86, wherein each of said one or more addresses has a corresponding key mask.

88. A memory comprising a data structure, said data structure comprising a plurality of sub-data structures, wherein each sub-data structure of said plurality of sub-data structures has associated therewith a key mask range.

89. The memory of claim 88, wherein each key mask range is associated with one or more key masks, said key masks designating variations in keys of said sub-data structures.

90. At least one program storage device readable by a machine, tangibly embodying at least one program of instructions executable by the machine to perform a method of creating a data structure, said method comprising:

obtaining a plurality of sub-data structures; and providing a key mask range for each sub-data structure of said plurality of sub-data structures, wherein said data structure comprises said plurality of sub-data structures.

91. The at least one program storage device of claim 90, wherein each key mask range is associated with one or more key masks, said key masks designating variations of keys of said sub-data structures.

92. A system of creating a data structure, said system comprising:

a plurality of sub-data structures; and means for providing a key mask range for each sub-data structure of said plurality of sub-data structures, wherein said data structure comprises said plurality of sub-data structures.

* * * * *